United States Patent
Sato et al.

(10) Patent No.: US 7,420,583 B2
(45) Date of Patent: Sep. 2, 2008

(54) IMAGE FORMING APPARATUS AND CONTROL METHOD THEREFOR

(75) Inventors: Mitsuhiko Sato, Chiba (JP); Shokyo Koh, Ibaraki (JP); Takashi Fujimori, Ibaraki (JP); Hidenori Sunada, Ibaraki (JP)

(73) Assignee: Canon Kabushiki Kaisha (JP)

( * ) Notice: Subject to any disclaimer, the term of this patent is extended or adjusted under 35 U.S.C. 154(b) by 129 days.

(21) Appl. No.: 10/676,804

(22) Filed: Oct. 1, 2003

(65) Prior Publication Data

US 2004/0155952 A1 Aug. 12, 2004

(30) Foreign Application Priority Data

Oct. 2, 2002 (JP) ............... 2002-290279

(51) Int. Cl.
*B41J 15/14* (2006.01)
*B41J 27/00* (2006.01)

(52) U.S. Cl. ..................... 347/243; 347/259
(58) Field of Classification Search ......... 347/115–117, 347/232–235, 240, 251, 228, 140, 243, 259–261, 347/248–250, 118; 399/50, 82, 38, 43, 85, 399/167, 299–302

See application file for complete search history.

(56) References Cited

U.S. PATENT DOCUMENTS

| | | | |
|---|---|---|---|
| 5,933,687 A * | 8/1999 | Okuno et al. ............... | 399/167 |
| 6,029,023 A | 2/2000 | Munemori et al. | |
| 6,094,208 A * | 7/2000 | Oda et al. .................... | 347/118 |
| 6,314,251 B1 * | 11/2001 | Gomi et al. .................... | 399/38 |
| 6,408,145 B1 * | 6/2002 | Ohki ........................... | 399/50 |
| 2002/0080220 A1 * | 6/2002 | Arai ........................... | 347/115 |
| 2003/0194247 A1 * | 10/2003 | Motoyama et al. ............ | 399/82 |

FOREIGN PATENT DOCUMENTS

| | | |
|---|---|---|
| JP | 07-325462 A | 12/1995 |
| JP | 2001-005344 A | 1/2001 |
| JP | 2001-154443 A | 6/2001 |

* cited by examiner

*Primary Examiner*—Hai C Pham
(74) *Attorney, Agent, or Firm*—Rossi, Kimms & McDowell LLP

(57) ABSTRACT

There is provided an image forming apparatus which is capable of reducing a period of time required for obtaining an image output, in the case of changing the image forming operation from a monochromatic image formation to a color image formation during execution of the image forming operation. A plurality of image forming units form images and overlap images the formed images onto a transfer material. A preparation for image formation is started in a first mode in which image formation is carried out by the plurality of image forming units while image formation is being carried out in a second mode in which image formation is carried out by at least one of the image forming units. The image formation is carried out in the first mode after the image formation in the second mode is completed.

8 Claims, 8 Drawing Sheets

IMAGE FORMING APPARATUS AND CONTROL METHOD THEREFOR

BACKGROUND OF THE INVENTION

1. Field of the Invention

The present invention relates to an image forming apparatus and a control method therefor, and more particularly, to an image forming apparatus having a plurality of image forming units and a control method therefor.

2. Description of the Related Art

Conventionally, a color image forming apparatus of this type has been proposed, which has a plurality of image forming units which each operate such that a laser beam which has been light-modulated according to recorded information is irradiated on a photosensitive drum, an electrostatic latent image on the photosensitive drum is developed and transferred onto a transfer sheet or an intermediate transfer belt using an electrophotographic method. In the color image forming apparatus, a transfer sheet is sequentially conveyed to the image forming units by means of a transfer material conveying belt, so that latent images on the photosensitive drums are overlappingly transferred onto the transfer sheet, or alternatively the latent images on the photosensitive drums are overlappingly transferred onto the intermediate transfer belt and then the transferred images are collectively transferred onto the transfer sheet, to thereby form a color image.

The color image forming apparatus of this type, however, has the disadvantage that the final overlapping images transferred onto the transfer sheet do not align with each other (mis-registration), due to mechanical installation errors of the photosensitive drums, variations in optical path length between the laser beams, and changes in the optical paths.

To overcome this disadvantage, there has been known a method in which a pattern image for registration correction which is transferred from the photosensitive drums onto the transfer belt is read by CCD or PD sensors provided at the respective photosensitive drums, and time differences in reading the image pattern between the CCD or PD sensors are detected in advance as mis-registration values for the respective color images, based upon which the image forming units for the respective color images are controlled so as to be synchronized in transfer timing with each other, to thereby perform image formation (see Japanese Laid-Open Patent Publication (Kokai) No. H6-051607, for example). When this method is used, however, the scanners of the image forming units have to be first started for synchronization before the start of a preparation for image formation of the image forming apparatus.

Further, the image forming apparatus of this type can be used to form an image using only one particular image forming unit. For example, a black and white image alone can be outputted.

When a single color image such as a black and white image is thus outputted, however, if all the image forming units are operated to make preparations for image formation, the output of image formation may get delayed, and the image forming units, which are not used for forming the image, are also activated into an image formation enabling state, resulting in that the image forming units become worn.

Conversely, if only the image forming unit that forms black and white images is activated into an image formation enabling state, if it is necessary to output a color image during execution of the image formation, the image forming units required for forming the color image are activated into the image formation enabling state, which results in a prolonged period of time before the color image is outputted. This will be explained in further detail with reference to FIG. 8.

FIG. 8 is a timing chart showing a control process for switching from an image forming operation for a black and white image to an image forming operation for a color image carried out by the conventional image forming apparatus.

When a signal for starting the image forming operation is issued, the photosensitive drums of all of the image forming units and the intermediate transfer unit are caused to start to be driven, and a scanner 13a of the image forming unit a for the black and white image also starts to be driven. The scanner 13a is accelerated to a predetermined rotational speed over a time period Ts1 and is then controlled to rotate at a constant rotational speed. After the scanner 13a starts to be driven, a preparation for image formation by the image forming unit a for the black and white image is started.

In the present example, it is assumed that the image forming unit a for the black and white image is disposed at such a position that it is the last image forming unit to carry out the transfer of the image onto the intermediate transfer member. Once the image forming unit a becomes ready for the image formation, image forming operations I1, I2 are started.

After the image forming operations I1, I2 for black and white images are completed, image forming operations I3d, I3c, I3b, I3a for color images are carried out. That is, after completion of the image formation I2, scanners 13b, 13c, 13d are activated to start preparations for image formation by the remaining image forming units b, c, d. The scanners 13b, 13c, 13d are then accelerated to a predetermined rotational speed over a time period Ts1 and are then controlled to rotate a constant rotational speed. Once the constant rotational speed has been reached, a synchronization operation (Ts2) is performed such that the scanners 13a to 13d are rotatively driven with a certain angular phase difference between them.

The preparation for image formation by the image forming unit b is started in such timing that the preparation is completed before the synchronization of the scanners 13a to 13d is completed (a time period Thd is given for the preparation for image formation). After the preparation for image formation by the image forming unit d is started, a preparation for image formation by the image forming unit c is started after a time interval Tst. Then, a preparation for image formation by the image forming unit b is started after a time interval Tst. The image forming operation I3d by the image forming unit d is started, once the preparation for image formation by the image forming unit d and the synchronization operation for the scanners 13a to 13d are completed. After the image forming operation I3d is started, image forming operations I3c, I3b, I3a by the image forming units c, b, a sequentially take place with a time interval Tst between the image forming operations. Thus, the image forming units b, c, d are required to be brought into the state for the image formation in color, which leads to a delay in the output of the image.

SUMMARY OF THE INVENTION

It is an object of the present invention to provide an image forming apparatus and a control method therefor, which are capable of reducing a period of time required for obtaining an image output, in the case of changing the image forming operation from a monochromatic image formation to a color image formation during execution of the image forming operation.

To attain the above object, in a first aspect of the present invention, there is provided an image forming apparatus comprising a plurality of image forming units that form images and overlap images the formed images onto a transfer material, a first controller that has a first mode in which image formation is carried out by the plurality of image forming units, and a second mode in which image formation is carried out by at least one of the image forming units, the first controller starting a preparation for the image formation in the first mode while the image formation is being carried out in the second mode, and a second controller that carries out the image formation in the first mode after the image formation in the second mode is completed.

To attain the above object, in a second aspect of the present invention, there is provided an image forming apparatus comprising a plurality of image forming units that form images and overlap images the formed images onto a transfer material, a plurality of scanners that form images in the plurality of image forming units respectively, a first controller that has a first mode in which the plurality of scanners are driven in synchronism with each other to carry out image formation by the plurality of image forming units, and a second mode in which at least one of the plurality of scanners is driven independently to carry out image formation by at least one of the image forming units, the first controller starting a preparation for the image formation in the first mode while the image formation is being carried out in the second mode, and a second controller that switches the plurality of scanners to be driven in the first mode from the second mode, to carry out the image formation in the first mode, after the image formation in the second mode is completed.

Preferably, the image formation in the second mode is monochromatic image formation, and the image formation in the first mode is image formation in a plurality of colors.

Preferably, the first controller starts a preparation for applying high voltage to at least one of the image forming units that is not being used for the image formation in the second mode.

Preferably, the first controller starts to drive at least one of the scanners that is not being used for the image formation in the second mode.

Preferably, the second controller synchronizes the plurality of scanners after the image formation in the second mode is completed.

Preferably, the first controller start to drive at least one of the scanners that is not being used for the image formation in the second mode, and the second controller synchronizes the plurality of scanners after the image formation in the second mode is completed.

To attain the above object, in a third aspect of the present invention, there is provided a method of controlling an image forming apparatus having a plurality of image forming units that form images and overlap images the formed images onto a transfer material, comprising a first control step of starting a preparation for image formation in a first mode in which image formation is carried out by the plurality of image forming units while image formation is being carried out in a second mode in which image formation is carried out by at least one of the image forming units, and a second control step of carrying out the image formation in the first mode after the image formation in the second mode is completed.

To attain the above object, in a fourth aspect of the present invention, there is provided a method of controlling an image forming apparatus having a plurality of image forming units that form images and overlap images the formed images onto a transfer material, and a plurality of scanners that form images in the plurality of image forming units respectively, comprising a first step of starting a preparation for image formation in a first mode in which the plurality of scanners are driven in synchronism with each other to carry out image formation by the plurality of image forming units while image formation is being carried out in a second mode in which at least one of the plurality of scanners is driven independently to carry out image formation by at least one of the image forming units, and a second control step of switching the plurality of scanners to be driven in the first mode from the second mode, to carry out the image formation in the first mode, after the image formation in the second mode is completed.

Preferably, the image formation in the second mode is monochromatic image formation, and the image formation in the first mode is image formation in a plurality of colors.

Preferably, the first control step comprises starting a preparation for applying high voltage to at least one of the image forming units that is not being used for the image formation in the second mode.

Preferably, the first control step comprises starting to drive at least one of the scanners that is not being used for the image formation in the second mode.

Preferably, the second control step comprises synchronizing the plurality of scanners after the image formation in the second mode is completed.

Preferably, the first control step comprises starting to drive at least one of the scanners that is not being used for the image formation in the second mode, and the second control step comprises synchronizing the plurality of scanners after the image formation in the second mode is completed.

The above and other objects, features, and advantages of the present invention will become more apparent from the following detailed description taken in conjunction with the accompanying drawings.

DETAILED DESCRIPTION OF THE PREFERRED EMBODIMENTS

Figure 1:
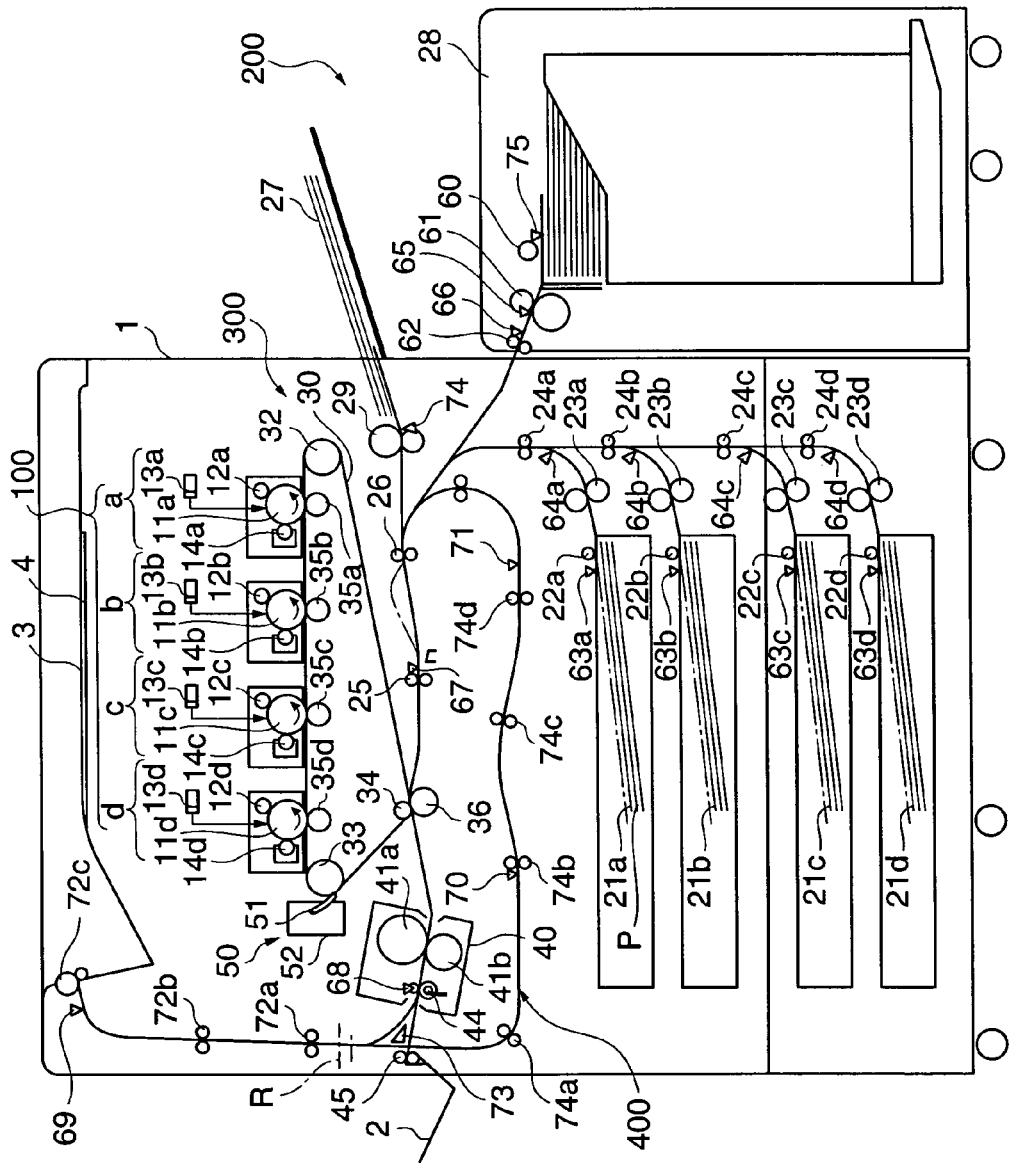
FIG. 1 is a cross-sectional view schematically showing the construction of an image forming apparatus according to a first embodiment of the present invention.

The present invention will now be described in detail below with reference to the accompanying drawings showing preferred embodiments thereof. In the drawings, elements and parts, which are identical throughout the views, are designated by identical reference numerals, and duplicate description thereof is omitted.

FIG. 1 is a cross-sectional diagram showing the construction of an image forming apparatus according to a first embodiment of the present invention. In FIG. 1, an image forming apparatus 1 forms images by an electrophotographic method, for example. The image forming apparatus 1 is comprised of an image forming section 100, which is comprised of four stations a, b, c, d as image forming units that are disposed in parallel and having an identical construction, a sheet feeder 200; an intermediate transfer section 300, a conveying section 400, a fixing unit 40, a operating panel 600, and a controller unit 700, not shown in FIG. 1.

The four stations a, b, c, d in the image forming section 100 are comprised of respective photosensitive drums 11a, 11b, 11c, 11d as image carriers, which are each supported by a central shaft thereof and rotatively driven by a driver motor, not shown, in a direction indicated by an arrow in FIG. 1. Roller chargers 12a, 12b, 12c, 12d, scanners 13a, 13b, 13c, 13d, and developing devices 14a, 14b, 14c, 14d are opposed to the outer peripheral surfaces of the respective photosensitive drums 11a to 11d and are arranged in a direction in which the photosensitive drums 11a to 11d are rotated.

The roller chargers 12a to 12d apply a uniform amount of electrostatic charge to the surfaces of the photosensitive drums 11a to 11d. Then, the scanners 13a to 13d cause the respective photosensitive drums 1a to 11d to be exposed by a ray of light such as a laser beam, which has been modulated according to a recording image signal, so that electrostatic latent images are formed on the respective photosensitive drums 11a to 11d. Further, the developing devices 14a to 14d storing respective toners (developing agents) of four colors (yellow, cyan, magenta, and black) visualize the electrostatic latent images. The visualized images are transferred onto an intermediate transfer member 30. By the above described processing, images are successively formed using respective toners of four colors.

The sheet feeder 200 is comprised of cassettes 21a, 21b, 21c, 21d, which store recording materials P, a manual feed tray 27, a deck 28, rollers for conveying the recording materials P, sensors for detecting passage of the recording materials P, sensors for detecting the presence of the recording materials P, a guide, not shown, for conveying the recording materials P along the conveying section 400, and pickup rollers 22a, 22b, 22c, 22d and BC rollers 23a, 23b, 23c, 23d for feeding the recording materials P sheet by sheet from the cassettes 21a to 21d. Although the pickup rollers 22a to 22d can feed a plurality of recording materials P at a time, the BC rollers 23a to 23d reliably separate one sheet from the fed recording materials P.

The recording material P separated by the BC rollers 23a to 23d is further conveyed by drawing rollers 24a to 24d and a pre-registration roller 26 to a registration roller 25. One sheet of recording material is separated from recording materials P stored in the manual feed tray 27 and conveyed by the pre-registration roller 26 to the registration roller 25. Further, recording materials P stored in the deck 28 are conveyed by a pick-up roller 61 to a sheet feed roller 61 which reliably separate one sheet from the conveyed recording materials P, and the separated sheet of recording material P is conveyed to a drawing roller 62. Further, the recording material P is conveyed by the pre-registration roller 26 to the registration roller 25.

The intermediate transfer section 300 is comprised of the intermediate transfer belt 30 which is made of polyethylene terephthalate (PET) or vinylidene polyfluoride (PVdF), a driving roller 32, which transmits a driving force to the intermediate transfer belt 30, a tension roller 33, which applies an appropriate tension to the intermediate transfer belt 30 with a bias force of a spring, not shown, and a driven roller 34, which forms a secondary transfer region by sandwiching the intermediate transfer belt 30 between itself and a secondary transfer roller 36, and the intermediate transfer belt is supported by the above rollers 32, 33, and 34. The driven roller 32, which is formed of a metal roller with a surface thereof coated with a rubber material (urethane or chloroprene) with a thickness of several millimeters to prevent the belt from slipping, and is rotatively driven by a stepping motor, not shown. Primary transfer rollers 35a, 35b, 35c, 35d are disposed on the backside of the intermediate transfer belt 30 at locations where the photosensitive drums 11a to 11d are opposed to the intermediate transfer belt 30, to which high voltage is applied to transfer toner images onto the intermediate transfer belt 30.

The secondary transfer roller 36 is opposed to the driven roller 34, and forms the secondary transfer region by a nip between the secondary transfer roller 36 and the intermediate transfer belt 30. The secondary transfer roller 36 is pressurized against the intermediate transfer belt 30 with an appropriate force. A cleaning device 50 for cleaning an image forming surface of the intermediate transfer belt 30 is disposed on the intermediate transfer belt 30 and downstream of the secondary transfer region. The cleaning device 50 includes a cleaner blade 51 made of polyurethane rubber, and a waste toner box 52 for storing waste toner.

The fixing unit 40 is comprised of a fixing roller 41a having a source of heat, such as a halogen heater provided therein, a roller 41b, which is pressurized against the roller 41a and may have a source of heat provided therein, and an inside sheet discharge roller 44, which conveys the recording material P discharged from the pair of rollers 41a, 41b.

On the other hand, when the recording material P has been conveyed to the registration roller 25, the registration roller 25 and rollers upstream of the registration roller 25 are temporarily stopped, and then the rollers including the registration roller 25 are again started for rotation in synchronism with timing in which image formation by the image forming section 100 is started. The recording material is fed to the secondary transfer region where the images are transferred onto the recording material P and fixed onto the recording material P by the fixing unit 40. Then, the recording material P passes through the inside sheet discharge roller 44 and then has its feeding direction switched by a switching flapper 73, in such a manner that when the switching flapper 73 is positioned on a face-up discharge side, the recording material P is discharged onto a face-up discharge tray 2 by an outside discharge roller 45, and when the switching flapper 73 is positioned on a face-down discharge side, the recording material P is conveyed toward reversing rollers 72a, 72b, 72c to be discharged onto a face-down discharge tray 3.

The conveying section 400 for the recording material P is provided with a plurality of sensors for detecting the passage of the recording material P, which include sheet feeding retry sensors 64a, 64b, 64c, 64d, a deck sheet feeding sensor 65, a deck drawing sensor 66, a registration sensor 67, an inside sheet discharge sensor 68, a face-down discharge sensor 69, a double side pre-registration sensor 70, and a double side sheet re-feeding sensor 71.

Further, cassette sheet presence sensors 63, 63b, 63c, 63d for detecting the presence of the recording materials P are disposed in cassettes 21a to 21d for storing the recording materials P, a manual feed tray sheet presence sensor 74 for detecting the presence of the recording materials P on the manual feed tray 27 is disposed in the manual feed tray 27, and a deck sheet presence sensor 75 for detecting the presence of the recording materials P in the deck 28 is disposed in the deck 28.

The control unit 700 is comprised of a control board, not shown, for controlling the operation of mechanisms in the above described component parts, and a motor driving board, not shown.

The operating panel 600 is disposed on an upper surface of the image forming apparatus 1 and enables selection of any of sheet supply cassettes 21a, 21b, 21c, 21d, the manual feed tray 27, the deck 28 that store the recording materials P, selection of either of the discharge trays (the face-up tray 2, the face-down tray 3), designation of a tab sheet bundle, and so forth.

Next, the operation of the image forming apparatus 1 will be described, by referring to the conveyance of recording materials P from the cassette 21a, for example.

When a predetermined period time has elapsed after a signal for starting an image forming operation is generated, recording materials P are caused to start to be fed sheet by sheet from the cassette 21a by the pickup roller 22a. Then, each recording material P is conveyed by the sheet feeding roller 23, the drawing roller 24a, and the pre-registration roller 26 to the registration roller 25. At this time, the registration roller 25 is not moving so that the tip or leading end of the recording material P abuts against the nip.

Next, the registration roller 25 is caused to start to rotate in synchronism with timing in which image formation by the image forming section 100 is started. The timing of this rotation is set such that the recording material P becomes aligned with the toner image primarily transferred onto the intermediate transfer belt 30 by the image forming section 100, in the secondary transfer region.

In the image forming section 100, on the other hand, when the above image formation starting signal is generated, the toner image formed on the photosensitive drum 11d which is the most upstream in the direction of rotation of the intermediate transfer belt 30 is primarily transferred onto the intermediate transfer belt 30 in the primary transfer region by the transfer roller 35 to which high voltage is applied. The primarily transferred toner image is conveyed to the next primary transfer region. In the stations a to d of the image forming section 100, image formation is sequentially carried out with a delay corresponding to the period of time over which the toner image is conveyed between adjacent ones of the stations a to d, so that in each of the stations b to d, the next toner image is transferred onto the recording material P with its leading end in alignment with the leading end of the image on the recording material P. Primary transfers are thus carried out in all the stations a to d so that finally toner images in four colors are transferred by primary transfer onto the intermediate transfer belt 30.

Then, the recording material P enters the secondary transfer region and comes into contact with the intermediate transfer belt 30. High voltage is applied to the secondary transfer roller 36 in synchronism with the timing in which the recording material P passes therethrough, so that the four-colored toner image, which has been formed on the intermediate transfer belt 30, is transferred onto the surface of the recording material P. Then, the recording material P is guided to the nip of the fixing roller 41a, and the toner image is fixed onto the surface of the recording material P under heat from the pair of rollers 41a, 41b and pressure from the nip. Then, the recording material P is discharged onto the face-up tray 2 or the face-down tray 3, depending on the direction in which the switching flapper 73 is switched.

Figure 2:
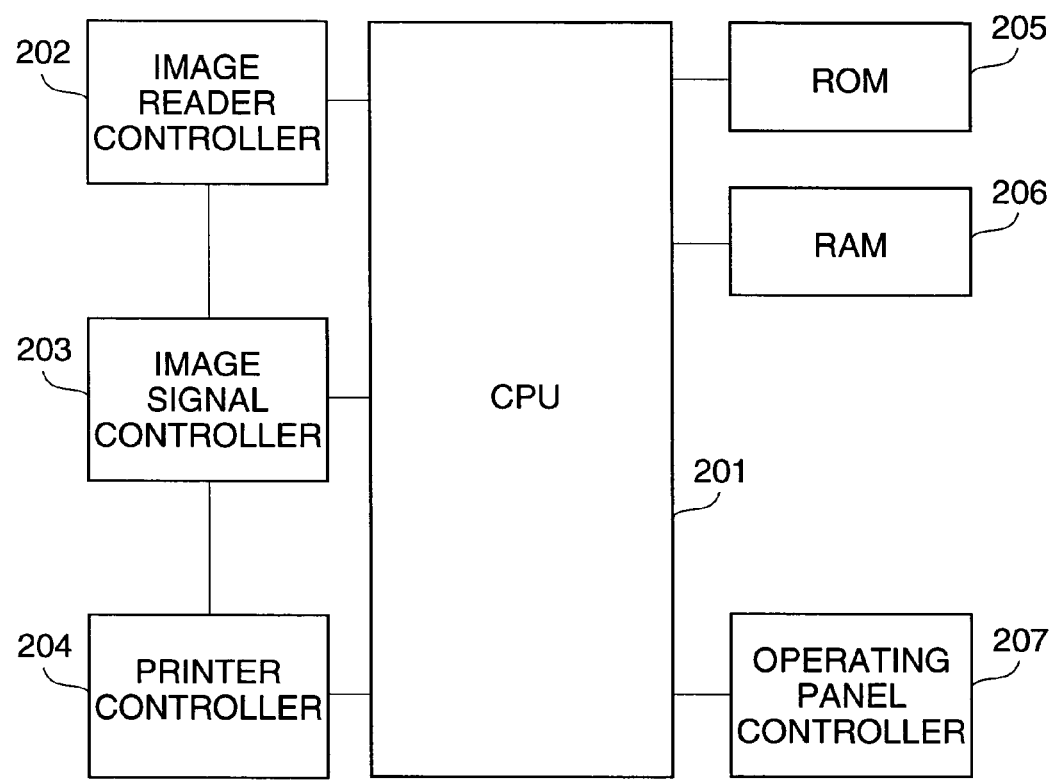
FIG. 2 is a block diagram showing the construction of a controller that controls the image forming apparatus 1 in FIG. 1.

FIG. 2 is a block diagram showing the construction of a controller that controls the image forming apparatus 1 in FIG. 1.

In FIG. 2, the controller is comprised of a CPU 201, an image reader controller 20, an image signal controller 203, a printer controller 204, a ROM 205, which stores control programs for the CPU 201, a RAM 206, which provides a working area for the CPU 201, and a operating panel controller 207. The CPU 201 executes the programs stored in the ROM 205 to control an image reader unit, not shown, through the image reader controller 202, or control operations in various operating modes, or control the entire image forming apparatus 1. The image signal controller 203 stores image data that has been read in by an image reader section, not shown, or image data received by the image signal controller 203 from a network, and outputs print data to the printer controller 204.

Next, the operation of the image forming apparatus 1 according to the present embodiment will be described with reference to FIG. 3 through FIG. 6.

Figure 3:
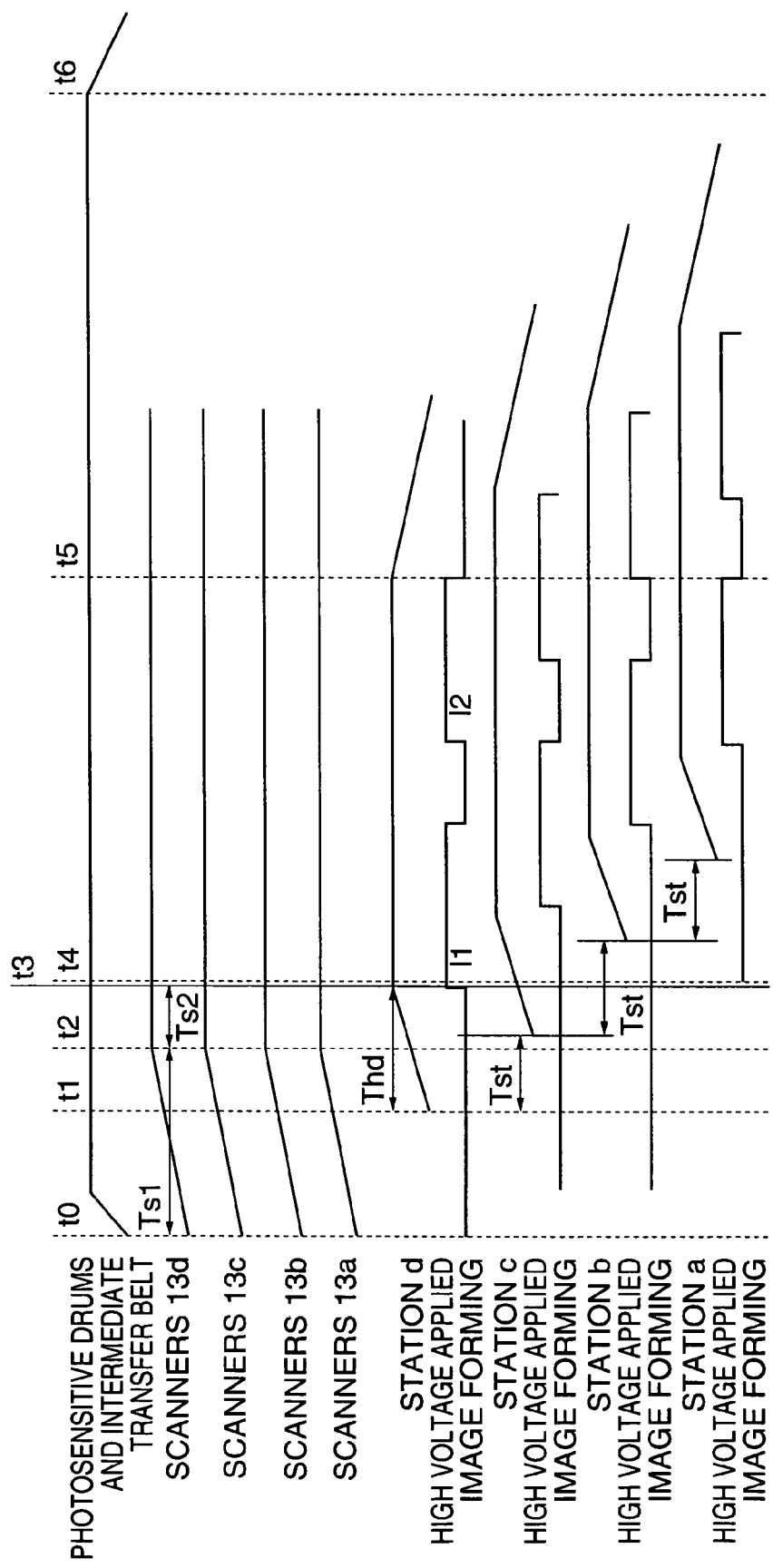
FIG. 3 is a timing chart showing timing in which image forming units (stations a, b, c, d) are controlled when a color image forming operation is carried out under the control of the controller shown in FIG. 2.

FIG. 3 shows a timing chart showing timing for controlling the stations a, b, c, d of the image forming section 100 when a color image forming operation is controlled by the controller in FIG. 2.

In FIG. 3, when an image forming operation starting signal is generated at a time point t0, this causes the photosensitive drums 11a to 11d of all the stations a to d of the image forming section 100, as well as the intermediate transfer belt 30 to start to be driven. At the same time, also the scanners 13a to 13d are caused to start to rotate. The scanners 13a to 13d are accelerated to a predetermined rotational speed over a time period Ts1 and then controlled to maintain a constant speed. Once the scanners 13a to 13d are controlled to the constant speed at a time point t2, synchronization processing (Ts2) is carried out such that the scanners 13a to 13d are rotatively driven with a certain angular phase difference between them. The angular phase difference is adjusted and maintained so that the images in four colors formed by the stations a to d of the image forming section 100 and transferred onto the intermediate transfer belt 30 are properly aligned with each other.

After the scanners 13a to 13d are thus stated to be driven, at a time point t1 a preparation for image formation is started at the station d of the image forming section 100. As described earlier with respect to the image formation process, the station d applies high DC or AC voltage to the roller charger 12d so as for the roller charger 12d to uniformly charge the surface of the photosensitive drum 11d.

Then, when the toner mage formed part of the surface of the photosensitive drum 11d, charged by the roller charger 12d, comes to the position of the developing roller 14d, a voltage bias required for developing is applied to the developing roller 14d. Similarly, a voltage bias required for image transfer is applied to the primary transfer roller 35d when the toner mage formed part of the surface of the photosensitive drum 11d comes to the position of the primary transfer roller 35d, to thereby complete the preparation for image formation. In this connection, it is known as prior art that there are rising times for the various biases to rise to the respective and required voltage levels, and therefore the timing in which the related signals are each outputted is determined by taking into account the rising time for the corresponding signal. By the above described process, the preparation for image formation is completed at the station d of the image forming section 100 at a time point Thd.

The time point t1, at which the preparation for image formation by the station d of the image forming section 100 is started, is determined by the sum of the preparation time periods Ts1 and Ts2 for the scanners 13a to 13d and by the preparation time period Thd for the image formation. In the example in FIG. 3, Ts1+Ts2>Thd, and (Ts1+Ts2−Thd)=(t1−t0).

For example, Ts1 is approximately 2.5 seconds, Ts2 is approximately 1 second, and Thd is approximately 1.4 seconds, and the resulting (t1−t0) is 2.1 seconds. While the values for Ts1 and Ts2 are constant in the present embodiment, the scanners 13a to 13d may be controlled such that the values for Ts1 and Ts2 are not constant. In such a case, the time point t1 is determined by an expected value for Ts1+Ts2.

Once the preparations of the scanners 13a to 13d and the preparation for image formation by the station d of the image forming section 100 are completed, an image forming operation I1 is started at a time point t4. The timing chart in FIG. 3 shows signals in the case where two pages worth of images are formed. An image forming operation I2 is carried out after a predetermined time interval after the image forming operation I1. Further, after the time point t1, a preparation for image formation by the station c of the image forming section 100 is started after the time interval Tst. Then, a preparation for image formation by the station b of the image forming section 100 is started after another time interval Tst, and a preparation for image formation by the station a of the image forming section 100 is also started after yet another time interval Tst. Then, after a time point, the image formations by the stations c, b, a of the image forming section 100 are sequentially carried out at time intervals Tst.

After image formations for the required number of pages are completed, the station d of the image forming section 100 performs an image formation completion process. In other words, the applications of high voltage biases are terminated in a reverse order to the order in which the preparations for image formations were performed. Then, the photosensitive drums 11a to 11d, the intermediate transfer belt 30, and the scanners 13a to 13d are stopped from being driven at a time point t6 when the photosensitive drums 11a to 11d and the intermediate transfer belt 30 are no longer required to be driven.

The time point t6 is set such that before the time point t6, the image formation completion processes for all of the stations a, b, c, d of the image forming section 100 must be executed, the recording material P, on which the image has been formed, must pass the driven roller 34 and the secondary transfer roller 36, and post-processing, such as cleaning of the intermediate transfer belt 30, must be completed.

Figure 4:
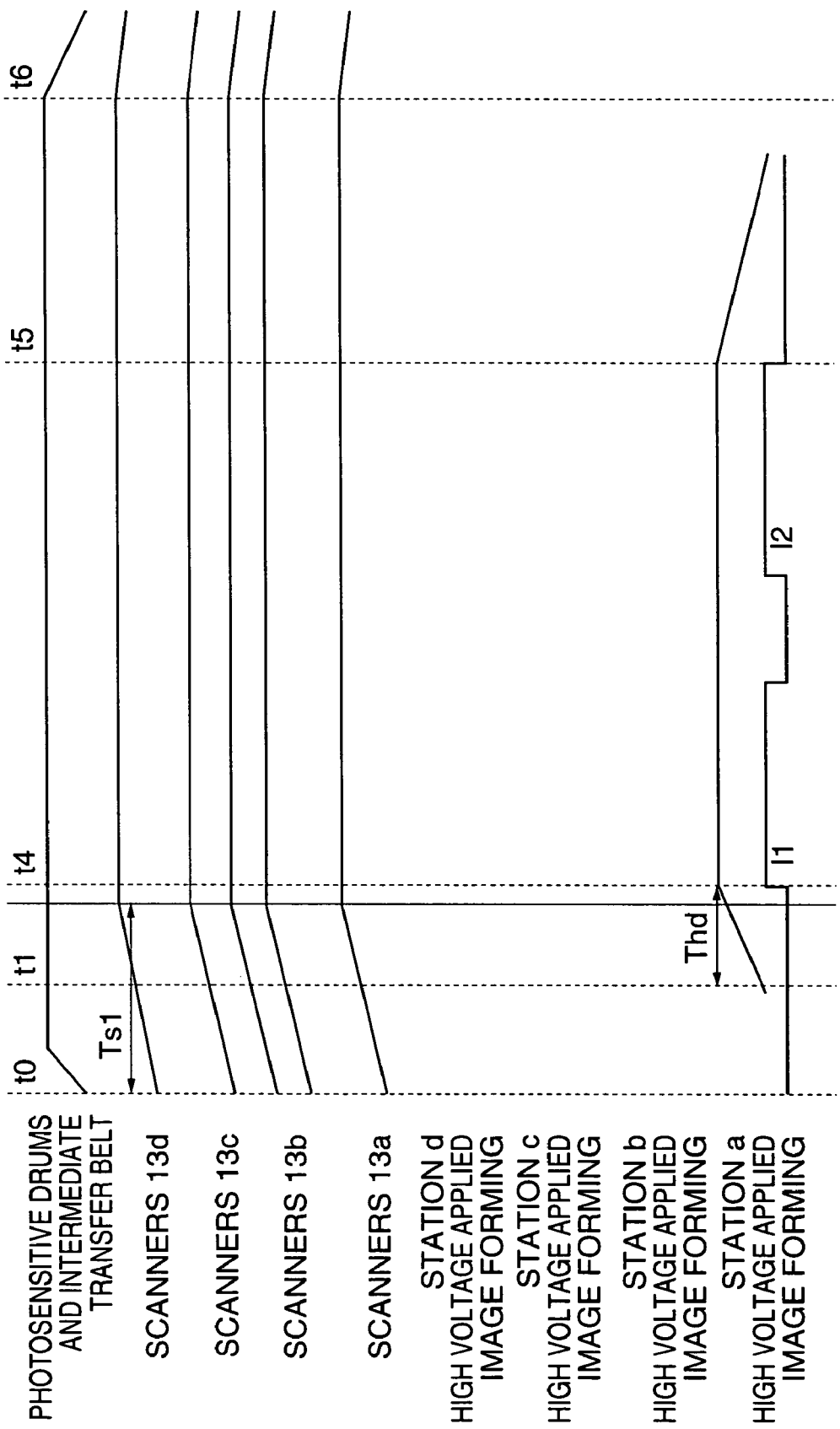
FIG. 4 is a timing chart showing timing in which the image forming units (stations a, b, c, d) are controlled when an image forming operation for a black and white image alone is carried out under the control of the controller shown in FIG. 2.

Next, control operations by the stations a, b, c, d of the image forming section 100 in the case of an image forming operation for a black and white image is carried out, will be described with reference to the timing chart in FIG. 4.

After an image forming operation starting signal is generated, the photosensitive drums 11a to 11d and the intermediate transfer belt 30 are caused to start to be driven at a time point t0. Further, the scanners 13a to 13d are also caused to start to be rotatively driven. The scanners 13a to 13d are accelerated to a predetermined rotational speed over a time period Ts1 and are then controlled to maintain the constant rotational speed. Because the image forming operation is carried out for the black and white image alone, no synchronization process for the scanners 13a to 13d is required. Because the synchronization process is not carried out, the image formation can be started much more quickly.

After the scanners 13a to 13d start to be driven, a preparation for image formation by the station a of the image forming section 100 is started at a time point t1. Because, again, the image forming operation is carried out only for a black and white image, the preparations for image formation for the other three colors are not required. According to the present embodiment, the station a of the image forming section 100, which is the last station to transfer the image to the intermediate transfer belt 30, carries out transfers of the black and white image. As a result, the period of time from the time point at which the image forming operation starting signal is generated to the time point at which the image formation is carried out at the station a of the image forming section 100 can be shortened by an amount (Ts2+3×Tst).

The preparation for image formation by the station a of the image forming section 100 is identical to the preparation described above with reference to FIG. 3. The time point t1 at which the preparation for image formation by the station a of the image forming section 100 is started is determined by the time period Ts1, which is required for preparations in the scanners 13a to 13d, and the time period Thd, which is required for the preparation for image formation. In the example in FIG. 4, Ts1>Thd and (Ts1−Thd)=(t1−t0).

After the preparations of the scanners 13a to 13d and the preparation for image formation by the station a of the image forming section 100 are completed, an image forming operation I1 is started at a time point t4. The timing chart in FIG. 4 shows a case where two pages worth of image forming operations are carried out. An image forming operation I2 is carried out after a predetermined time interval after the image forming operation I1. When the image formations for the required number of pages are completed, the station d of the image forming section 100 executes an image formation completion process that is similar to FIG. 3.

Then, at a time point t6 at which the photosensitive drums 11a to 11d and the intermediate transfer belt 30 are no longer required to be driven, the photosensitive drums 11a to 11d, the intermediate transfer belt 30, and the scanners 13a to 13d are stopped from being driven.

The time point T6 is set such that before the time point t6, the image formation completion process for the station a in the image forming section 100 must be completed, the recording material P, on which the image has been formed, must pass the driven roller 34 and the secondary transfer roller 36, and post processing, such as cleaning of the intermediate transfer belt 30, must be completed.

Figure 5:
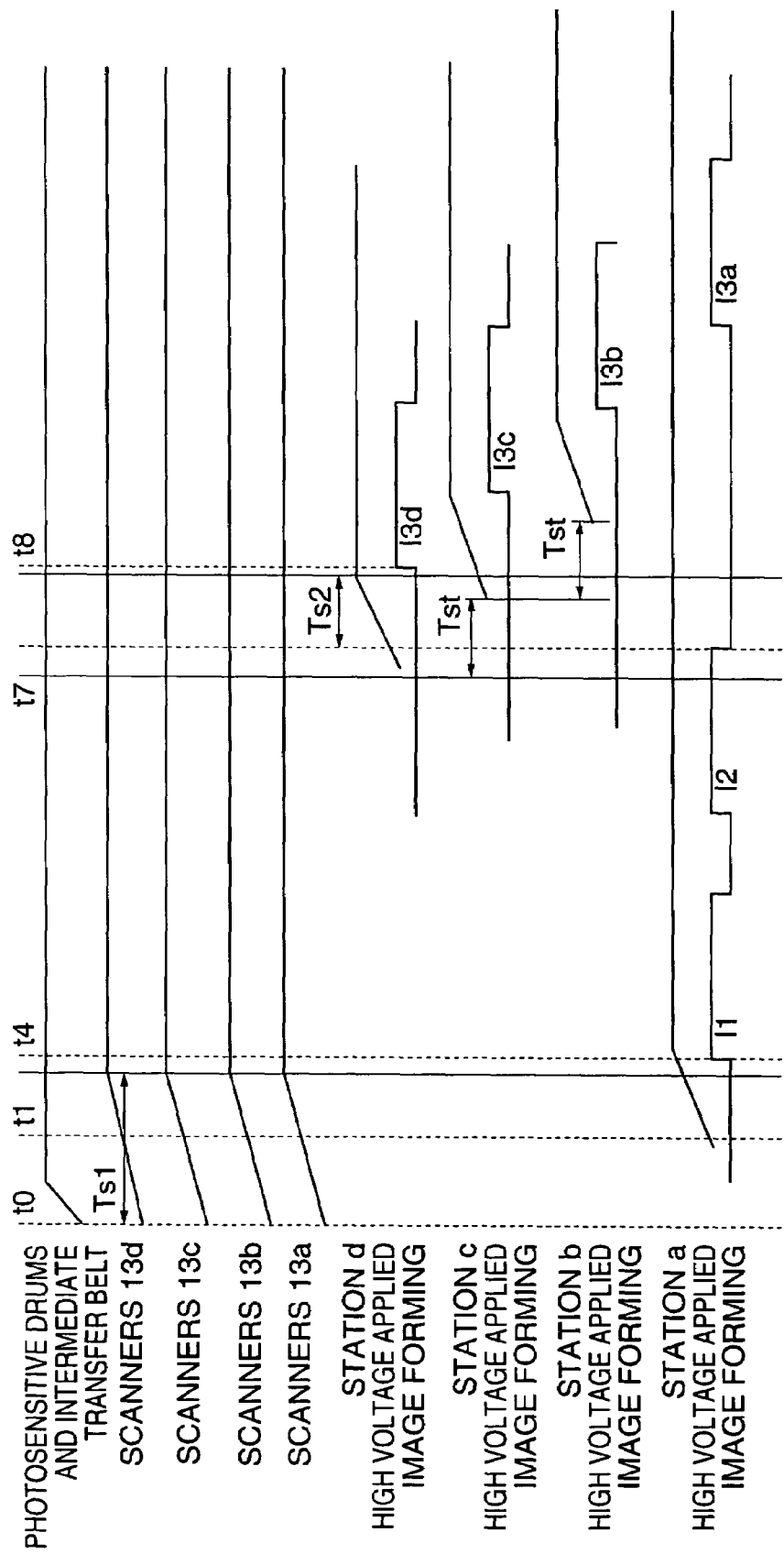
FIG. 5 is a timing chart showing timing in which an image forming operation for a black and white image is switched to an image forming operation for a color image under the control of the controller shown in FIG. 2.

Next, control operations for switching from an image forming operation for a black and white image to an image forming operation for a color image will be described with reference to the timing chart in FIG. 5. In FIG. 5, I1 and I2 refer to image forming operations for black and white images, while I3d, I3c, I3b, I3a refer to image forming operations for color images. Operations that are carried out before the image forming operation I1 are similar to those described above with reference to FIG. 4.

Once it is determined that the operations I3d, I3c, I3b, I3a are image forming operations for color images, a preparation for image formation is started at the station d of the image forming section 100. The preparation for image formation by the station d of the image forming section 100 is started at a time point t7, which is set at a time point after it is determined that the operations I3d, I3c, I3b, I3a are image forming operations for color images and the preparation for image formation by the station d of the image forming section 100 is completed after a time point t8, at which the synchronization time period Ts2 elapses after the image forming operation I2 is completed. After the image forming operation I2 is completed, the scanners 13a to 13d are caused to execute the synchronization process. After the scanners 13a to 13d complete the synchronization process and the preparation for image formation by the station d of the image forming section 100 is completed, the station d of the image forming section 100 is caused to start the image forming operation I3d. Thereafter, as is the case with FIG. 3, the stations c and b of the image forming section 100 are caused to start the respective preparations for the image formation at the time intervals Tst after the time point t7. Then, images are sequentially formed by the image forming operations I3c and I3b, and finally an image is formed by the image forming operation I3a.

Figure 6:
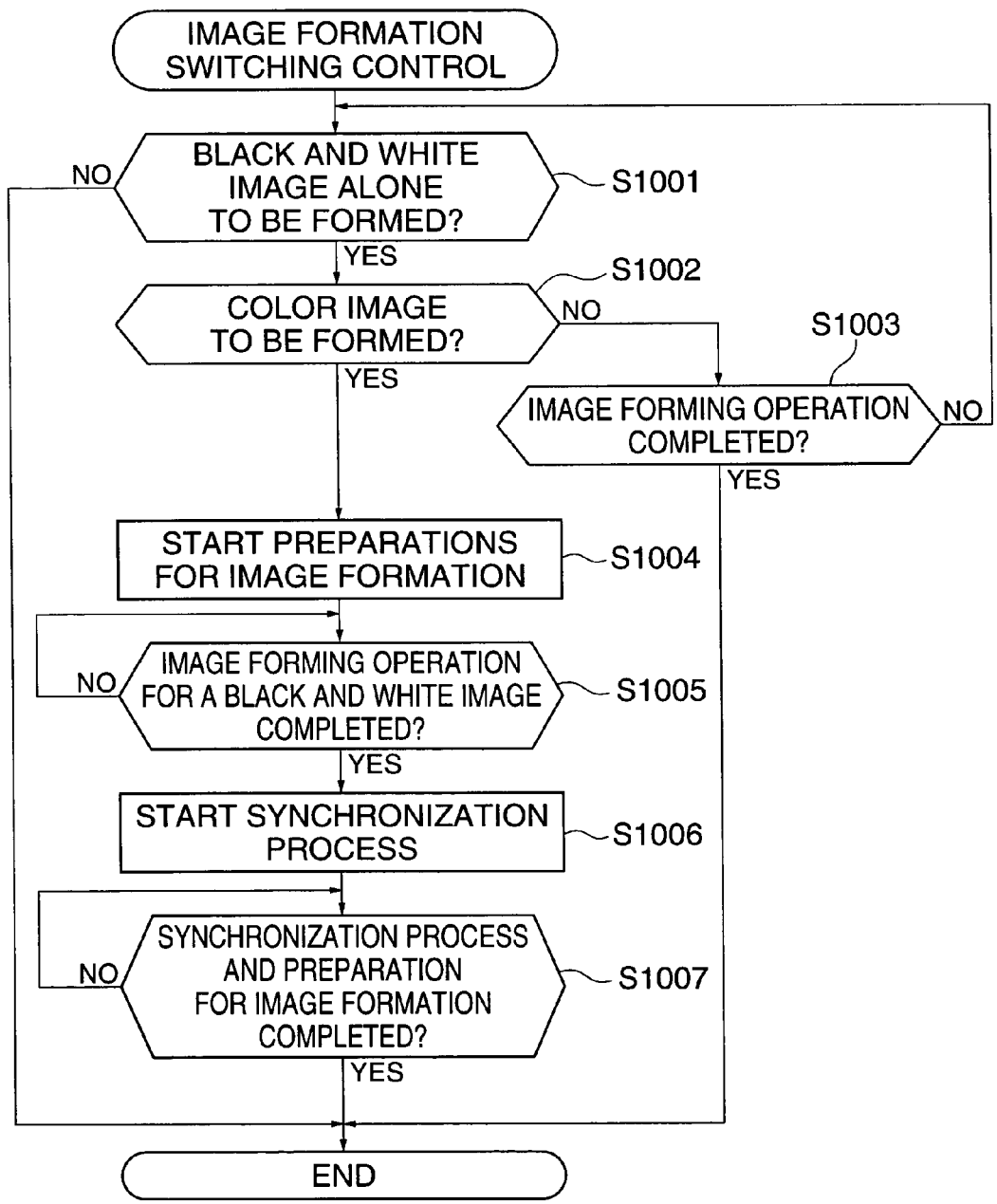
FIG. 6 is a flow chart showing a control process for switching from an image forming operation for a black and white image to an image forming operation for a color image under the controller operating in the timing shown in FIG. 5.

FIG. 6 is a flowchart showing the image formation switching control process shown in the timing chart FIG. 5. This process is executed by the CPU 201 according to a program stored in the ROM 205 in FIG. 2.

In FIG. 6, first, in a step S1001, it is determined whether the image formation mode is for forming a black and white image alone. If the determination result shows that the image formation mode is for forming a color image, then the process is terminated. If the image formation mode is for forming a black and white image, the process proceeds to a step S1002. It is determined in a step S1002 whether there is the next image forming operation that is for forming a color image. If the determination result show that the next image forming operation is not for forming a color image, the process proceeds to a step S1003. If the next image forming operation is for forming a color image, the process proceeds to a step S1004.

In the step S1003, it is determined whether the image forming operation has been completed. If it is determined that the operation has not been completed, the process returns to the step S1001. If the operation has been completed, the present process is terminated.

In the step S1004, preparations for image formation at the stations d, c, b of the image forming section 100 are started. Detail description of the preparations for image formation of the image forming section 100 is omitted. Once the preparations for image formation are started in the step S1004, the process proceeds to a step S1005, where it is determined whether an image forming operation for a black and white image has been completed. If it is determined that the image formation has not yet been completed, the step S1005 is repeated. If the image formation has been completed, the process proceeds to a step S1006.

In the step S1006, the synchronization process for the scanners 13a to 13d is started, and then the process proceeds to a step S1007, where it is determined whether the synchronization process for the scanners 13a to 13d and the preparation for image formation by the station d of the image forming section 100 have been completed. If it is determined that these operations have not yet been completed, the step S1007 is repeated. Once it is determined that the operations have been completed, the process is terminated.

As described above, according to the present embodiment, when the image formation mode is switched from a monochromatic (for example, in black) image formation mode to a color image formation mode, preparations for image formation, which do not affect a monochromatic image forming operation, are carried out, while a process that does not affect the monochromatic image forming operation (synchronization process) is carried out after the monochromatic image forming operation is completed. As a result, the time period before the formed image is output can be shortened in the case where the image formation mode is switched from the monochromatic image formation mode to the color image formation mode.

Next, a second embodiment of the present invention will be described.

According to the second embodiment, in the case where the image formation mode is switched from an image forming operation for a black and white image to an image forming operation for a color image, the scanners 13d, 13c, 13b are not rotatively driven during the image forming operation for a black and white image.

Figure 7:
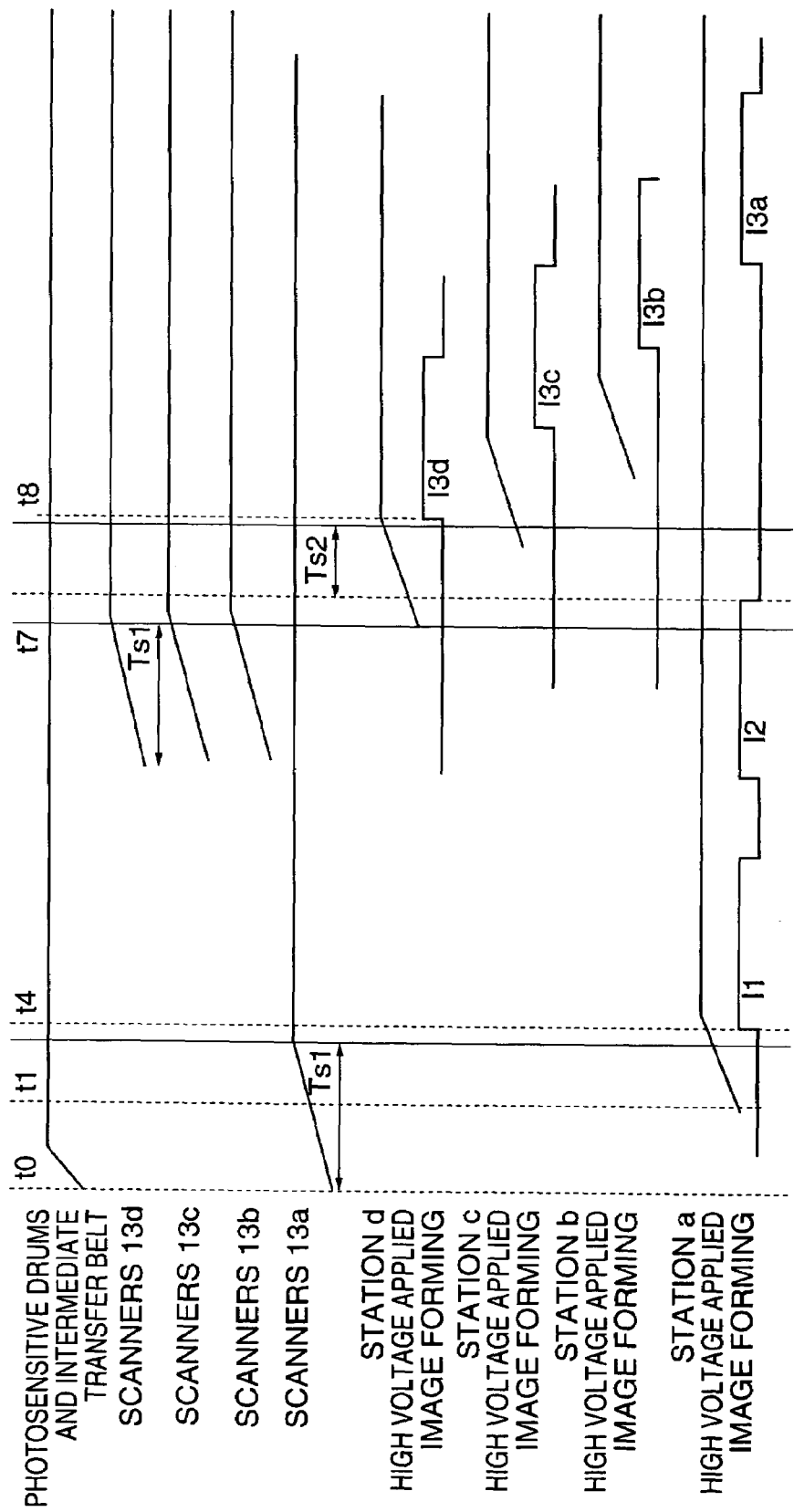
FIG. 7 is a timing chart showing timing in which an image forming operation for a black and white image is switched to an image forming operation for a color image, according to a second embodiment of the present invention.
Figure 8:
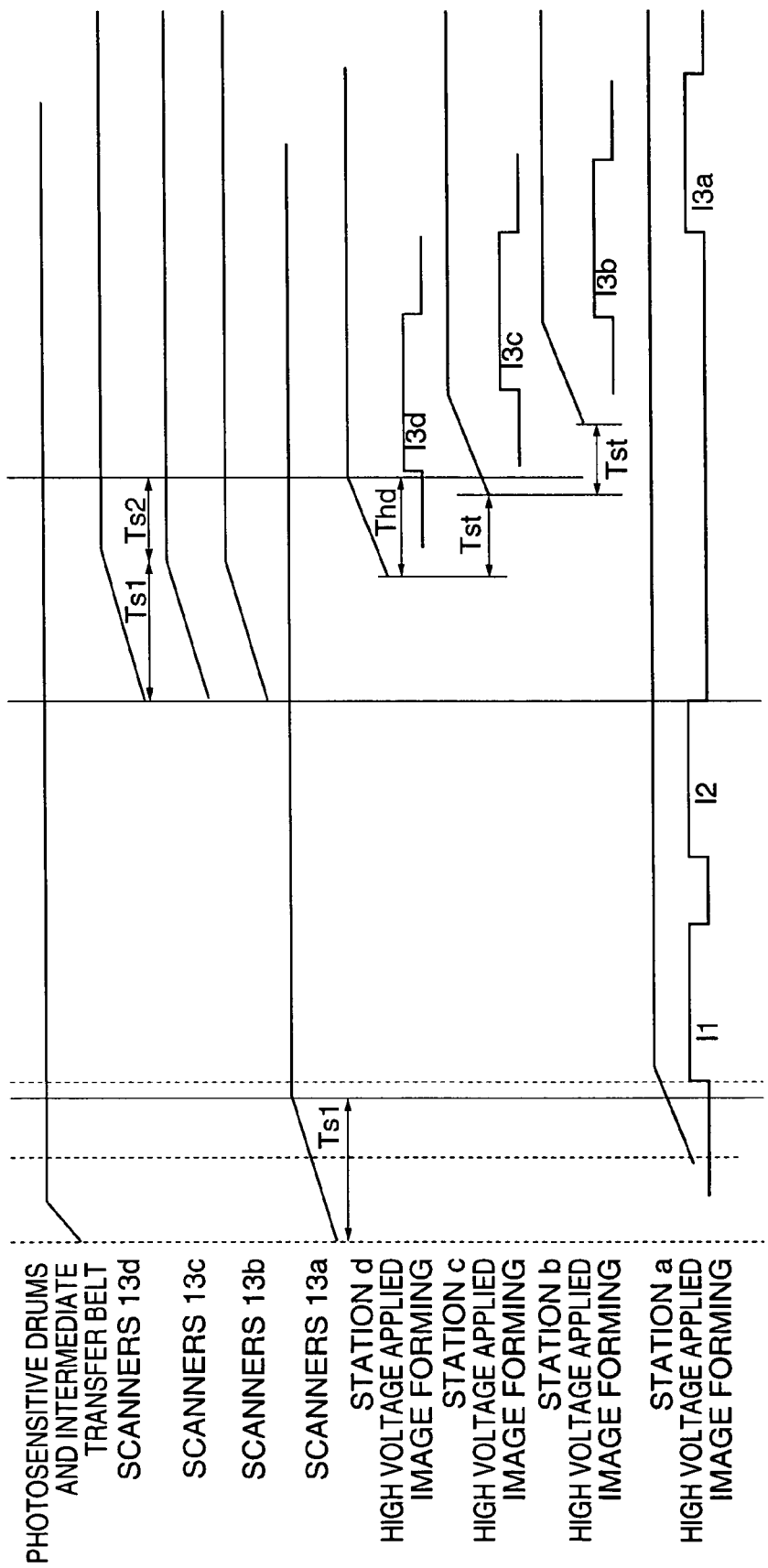
FIG. 8 is a timing chart showing control timing in which an image forming operation for a black and white image is switched to an image forming operation for a color image in a conventional image forming apparatus.

FIG. 7 is a timing chart showing timing in which an image forming operation for a black and white image is switched to an image forming operation for a color image, according to the second embodiment. The present embodiment is basically the same as the first embodiment described above with reference to FIG. 5, but in the present embodiment, in the case where an image forming operation for a black and white image is switched to an image forming operation for a color image, the scanners 13b, 13c, 13d are not caused to be driven when the image formation for a black and white image is carried out, and when it is determined that the image forming operations I3d, I3c, I3b, I3a are for forming color images, then the scanners 13b, 13c, 13d are caused to be driven. Thereafter, the scanners 13b, 13c, 13d are caused to be driven after the image forming operation I1 is completed, and upon the lapse of the time period Ts1 after the scanners 13b, 13c, 13d are caused to be driven, and after the image forming operation I2 is completed the synchronization process for the scanners 13a to 13d is started. Except for the above, the control operation is identical with that of the first embodiment.

Effects similar to those of the first embodiment are obtained with the present embodiment.

Although in the first and second embodiments described above, the operations other than the synchronization process for the scanners 13a to 13d are carried out before the monochromatic image formation is completed, the present invention is not limited to this, but insofar as a plurality of image forming units carry out preparation processes including one or more preparation processes carried out by one or more image forming units that affect the other image forming unit(s), and preparation processes that do not affect the other image forming unit(s), the present invention may be embodied in other forms, which fall within the scope of the present invention, providing similar effects.

The present invention is not limited to the apparatuses of the above described embodiments, but may either be applied to a system composed of a plurality of apparatuses or to a single apparatus.

It is to be understood that the object of the present invention may also be accomplished by supplying a system or an apparatus with a storage medium in which a program code of software which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and hence the storage medium on which the program code is stored constitutes the present invention.

Examples of the storage medium for supplying the program code include a floppy (registered trademark) disk, a hard disk, an optical disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM. Further, the program code may be downloaded via a network.

Further, it is to be understood that the functions of either of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing the program code read out from the storage medium into a memory provided in an expansion board inserted into a computer or in an expansion unit connected to the computer and then causing a CPU or the like provided in the expansion board or the expansion unit to perform a part or all of the actual operations based on instructions of the program code.

What is claimed is:

1. An image forming apparatus comprising:
   a plurality of image forming units that form images;
   a plurality of scanners that form images in said plurality of image forming units respectively;
   a controller that has a first mode in which said plurality of scanners are driven in synchronism with each other to carry out image formation by said plurality of image forming units, and a second mode in which one of said plurality of scanners is driven to carry out image formation by one of said image forming units, said controller causing, in the case where the image formation in the second mode is switched to the image formation in the first mode, while the image formation is being carried out in the second mode, all the scanners not being used for the image formation in the second mode to start to be driven and then switching the image formation to the first mode after the image formation in the second mode is completed.

2. An image forming apparatus as claimed in claim 1, wherein the image formation in the second mode is monochromatic image formation, and the image formation in the first mode is image formation in a plurality of colors.

3. An image forming apparatus as claimed in claim 1, wherein said controller starts a preparation for applying high voltage to the one of said image forming units while the image formation is being carried out in the second mode.

4. An image forming apparatus as claimed in claim 1, wherein said controller synchronizes said plurality of scanners after the image formation in the second mode is completed.

5. A method of controlling an image forming apparatus having a plurality of image forming units that form images, and a plurality of scanners that form images in said plurality of image forming units respectively, wherein said plurality of scanners are driven in synchronism with each other to carry out image formation by said plurality of image forming units in a first mode and one of said plurality of scanners is driven to carry out image formation by one of said image forming units in a second mode, the method comprising the steps of:
   causing, in the case where the image formation in the second mode is switched to the image formation in the first mode, while the image formation is being carried out in the second mode, all the scanners not being used for the image formation in the second mode to start to be driven; and
   switching the image formation to the first mode after the image formation in the second mode is completed.

6. A method of controlling an image forming apparatus as claimed in claim 5, wherein the image formation in the second mode is monochromatic image formation, and the image formation in the first mode is image formation in a plurality of colors.

7. A method of controlling the image forming apparatus as claimed in claim 5, wherein a preparation for applying high voltage to the one of the image forming units is started while the image formation is being carried out in the second mode.

8. A method of controlling an image forming apparatus as claimed in claim 5, wherein the control step comprises synchronizing the plurality of scanners after the image formation in the second mode is completed.

* * * * *